United States Patent
Bonawitz et al.

(10) Patent No.: US 10,324,161 B2
(45) Date of Patent: *Jun. 18, 2019

(54) BALLOON-BASED POSITIONING SYSTEM AND METHOD

(71) Applicant: LOON LLC, Mountain View, CA (US)

(72) Inventors: Keith Bonawitz, Berkeley, CA (US); Richard Wayne DeVaul, Mountain View, CA (US); Eric Teller, Palo Alto, CA (US); Joshua Weaver, San Jose, CA (US)

(73) Assignee: Loon LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,292

(22) Filed: Nov. 6, 2017

(65) Prior Publication Data
US 2018/0067188 A1  Mar. 8, 2018

Related U.S. Application Data

(63) Continuation of application No. 14/018,153, filed on Sep. 4, 2013, now Pat. No. 9,829,561.

(51) Int. Cl.
| | |
|---|---|
| *G01S 1/02* | (2010.01) |
| *G01S 5/02* | (2010.01) |
| *G01S 5/16* | (2006.01) |

(52) U.S. Cl.
CPC ............ *G01S 5/0289* (2013.01); *G01S 1/022* (2013.01); *G01S 5/16* (2013.01)

(58) Field of Classification Search
CPC ............ H04B 7/18504; H04B 10/1129; H04B 7/18502; H04B 7/18508; G01S 19/11;
(Continued)

(56) References Cited

U.S. PATENT DOCUMENTS

| | | |
|---|---|---|
| 4,445,120 A | 4/1984 | Rosenthal |
| 5,375,059 A | 12/1994 | Kyrtsos et al. |
| | (Continued) | |

FOREIGN PATENT DOCUMENTS

| | | |
|---|---|---|
| WO | 9715992 A1 | 5/1997 |
| WO | 2013106279 A1 | 7/2013 |

OTHER PUBLICATIONS

Liu, Dajie, "Arbitrary Triangulateration Network Adjustment Algorithm," Bulletin of Surveying and Mapping, pp. 1-6, Mar. 1983 (machine translation of the description).
(Continued)

*Primary Examiner* — Matthew C Sams
(74) *Attorney, Agent, or Firm* — Botos Churchill IP Law

(57) ABSTRACT

Disclosed herein are embodiments of a balloon-based positioning system and method. In one example embodiment, a system includes a group of at least three balloons deployed in the stratosphere and a control system configured for: determining a first set of spatial relationships relating to the group; determining a second set of spatial relationships relating to at least a portion of the group and to a reference point; determining a position of the reference point relative to the earth; using the determined first set, the determined second set, and the determined position of the reference point relative to the earth as a basis for determining a position of a target balloon in the group relative to the earth; and transmitting the determined position of the target balloon relative to the earth.

20 Claims, 12 Drawing Sheets

(58) Field of Classification Search
CPC ........ G01S 17/42; G01S 1/022; G01S 5/0289;
G01S 5/16; B64B 1/40
See application file for complete search history.

(56) References Cited

U.S. PATENT DOCUMENTS

| | | | |
|---|---|---|---|
| 5,629,855 A | 5/1997 | Kyrtsos et al. | |
| 5,717,404 A | 2/1998 | Malla | |
| 6,151,308 A | 11/2000 | Ibanez-Meier et al. | |
| 6,167,263 A * | 12/2000 | Campbell | B64B 1/06 244/164 |
| 7,844,218 B2 | 11/2010 | Seligsohn et al. | |
| 7,913,948 B2 | 3/2011 | Porter | |
| 9,285,450 B2 * | 3/2016 | DeVaul | G01S 1/042 |
| 9,484,634 B1 * | 11/2016 | Behroozi | H01Q 1/246 |
| 9,715,992 B2 | 7/2017 | Hoogenboom et al. | |
| 9,829,561 B2 * | 11/2017 | Bonawitz | G01S 5/0289 |
| 9,871,786 B2 * | 1/2018 | Condra | H04L 63/0846 |
| 10,162,044 B2 * | 12/2018 | DeVaul | G01S 1/042 |
| 2002/0167702 A1 | 11/2002 | Badesha et al. | |
| 2003/0025034 A1 | 2/2003 | Akahori | |
| 2006/0063529 A1 | 3/2006 | Seligsohn et al. | |
| 2010/0292871 A1 | 11/2010 | Schultz et al. | |
| 2012/0053757 A1 | 3/2012 | Breshears | |
| 2012/0172061 A1 | 7/2012 | Dods et al. | |
| 2012/0188120 A1 | 7/2012 | Tsai et al. | |
| 2013/0141282 A1 | 6/2013 | Peyrotte et al. | |
| 2013/0175391 A1 | 7/2013 | DeVaul et al. | |
| 2013/0177322 A1 | 7/2013 | DeVaul et al. | |
| 2014/0085135 A1 * | 3/2014 | Devaul | G01S 1/042 342/357.4 |
| 2015/0061937 A1 * | 3/2015 | Bonawitz | G01S 5/0289 342/451 |
| 2016/0154085 A1 * | 6/2016 | DeVaul | G01S 1/042 342/357.4 |
| 2017/0026370 A1 * | 1/2017 | Condra | H04L 63/0846 |

OTHER PUBLICATIONS

Global Positioning System: The Mathematics of GPS Receivers Richard B. Thompson (1998).
Basics of the GPS Technique: Observation Equations Geoffrey Blewitt (1997).
International Search Report and Written Opinion dated May 29, 2015, issued in connection International Patent Application No. PCT/US2014/054064 filed Sep. 4, 2014.
Written Opinion of the International Searching Authority (PCT/ISA/237), dated Mar. 11, 2014, 7 pages.
Third Office Action for Chinese Patent Application No. 201480048722.2, dated Jun. 29, 2018.

* cited by examiner

BALLOON-BASED POSITIONING SYSTEM AND METHOD

CROSS-REFERENCE TO RELATED APPLICATION

This application is a continuation application of U.S. patent application Ser. No. 14/018,153, filed Sep. 4, 2013, which is hereby incorporated by reference in its entirety.

BACKGROUND

Unless otherwise indicated herein, the materials described in this section are not prior art to the claims in this application and are not admitted to be prior art by inclusion in this section.

Many positioning systems exist that help determine a position of a device. One of the most commonly used positioning systems is the Global Positioning System (GPS), which is maintained by the United States government. The GPS is a satellite-based system that provides positioning information to ground-based receivers located throughout the world. The GPS include a fleet of thirty-two atomic clock satellites. Each satellite orbits the earth and broadcasts a signal containing satellite-positioning data for the respective satellite. A given receiver then receives signals from different satellites, and processes the collective satellite-positioning data contained therein as a basis for determining the receiver's position. However, for a variety of reasons, the receiver may be unable to receive one or more of these signals, or it may receive signals that have been distorted. As a result, receivers are often unable to accurately determine their position. Accordingly, improved positioning systems are desired.

SUMMARY

An example balloon-based positioning system may include a group of at least three balloons and a control system. Generally, the control system may be configured to determine a position of each balloon in the group relative to the earth. The control system may make these determinations based on one or more spatial relationships, including for example a distance between two balloons or a distance between a balloon and a reference point that has a known position relative to the earth. The control system may then transmit the determined positions to the respective balloons, which in turn may broadcast the determined positions such that they may be received and processed by a ground-based receiver. This may allow the ground-based receiver to determine its position relative to the earth.

In one aspect, a system includes a group of at least three balloons deployed in the stratosphere and a control system. The control system is configured for: determining a first set of spatial relationships relating to the group; determining a second set of spatial relationships relating to at least a portion of the group and to a reference point; determining a position of the reference point relative to the earth; using the determined first set, the determined second set, and the determined position of the reference point relative to the earth as a basis for determining a position of a target balloon in the group relative to the earth; and transmitting the determined position of the target balloon relative to the earth.

In another aspect, a computer-readable medium has stored thereon program instructions that upon execution by a processor, cause performance of a set of functions. The set of functions include: determining a first set of spatial relationships relating to a group of at least three balloons deployed in the stratosphere; determining a second set of spatial relationships relating to at least a portion of the group and to a reference point; determining a position of the reference point relative to the earth; using the determined first set, the determined second set, and the determined position of the reference point relative to the earth as a basis for determining a position of a target balloon in the group relative to the earth; and transmitting the determined position of the target balloon relative to the earth.

In yet another aspect, a method involves: determining, by a computing device, a first set of spatial relationships relating to a group of at least three balloons deployed in the stratosphere, wherein determining the first set comprises (i) determining, by the computing device, a distance between a balloon in the group and another balloon in the group, and (ii) determining, by the computing device, an angle between a first vector and a second vector, wherein the first vector extends from a first balloon in the group towards a second balloon in the group, and wherein the second vector extends from the first balloon towards a third balloon in the group; determining a second set of spatial relationships relating to at least a portion of the group and to a reference point; determining, by a computing device, a position of the reference point relative to the earth; using the determined first set, the determined second set, and the determined position of the reference point relative to the earth as a basis for determining a position of a target balloon in the group relative to the earth; and transmitting the determined position of the target balloon relative to the earth.

In yet another aspect, disclosed are means for: determining a first set of spatial relationships relating to a group of at least three balloons deployed in the stratosphere; determining a second set of spatial relationships relating to at least a portion of the group and to a reference point; determining a position of the reference point relative to the earth; using the determined first set, the determined second set, and the determined position of the reference point relative to the earth as a basis for determining a position of a target balloon in the group relative to the earth; and transmitting the determined position of the target balloon relative to the earth.

In yet another aspect, disclosed are means for: determining a first set of spatial relationships relating to a group of at least three balloons deployed in the stratosphere, wherein determining the first set comprises (i) determining a distance between a balloon in the group and another balloon in the group, and (ii) determining an angle between a first vector and a second vector, wherein the first vector extends from a first balloon in the group towards a second balloon in the group, and wherein the second vector extends from the first balloon towards a third balloon in the group; determining a second set of spatial relationships relating to at least a portion of the group and to a reference point; determining a position of the reference point relative to the earth; using the determined first set, the determined second set, and the determined position of the reference point relative to the earth as a basis for determining a position of a target balloon in the group relative to the earth; and transmitting the determined position of the target balloon relative to the earth.

DETAILED DESCRIPTION

Figure 1:
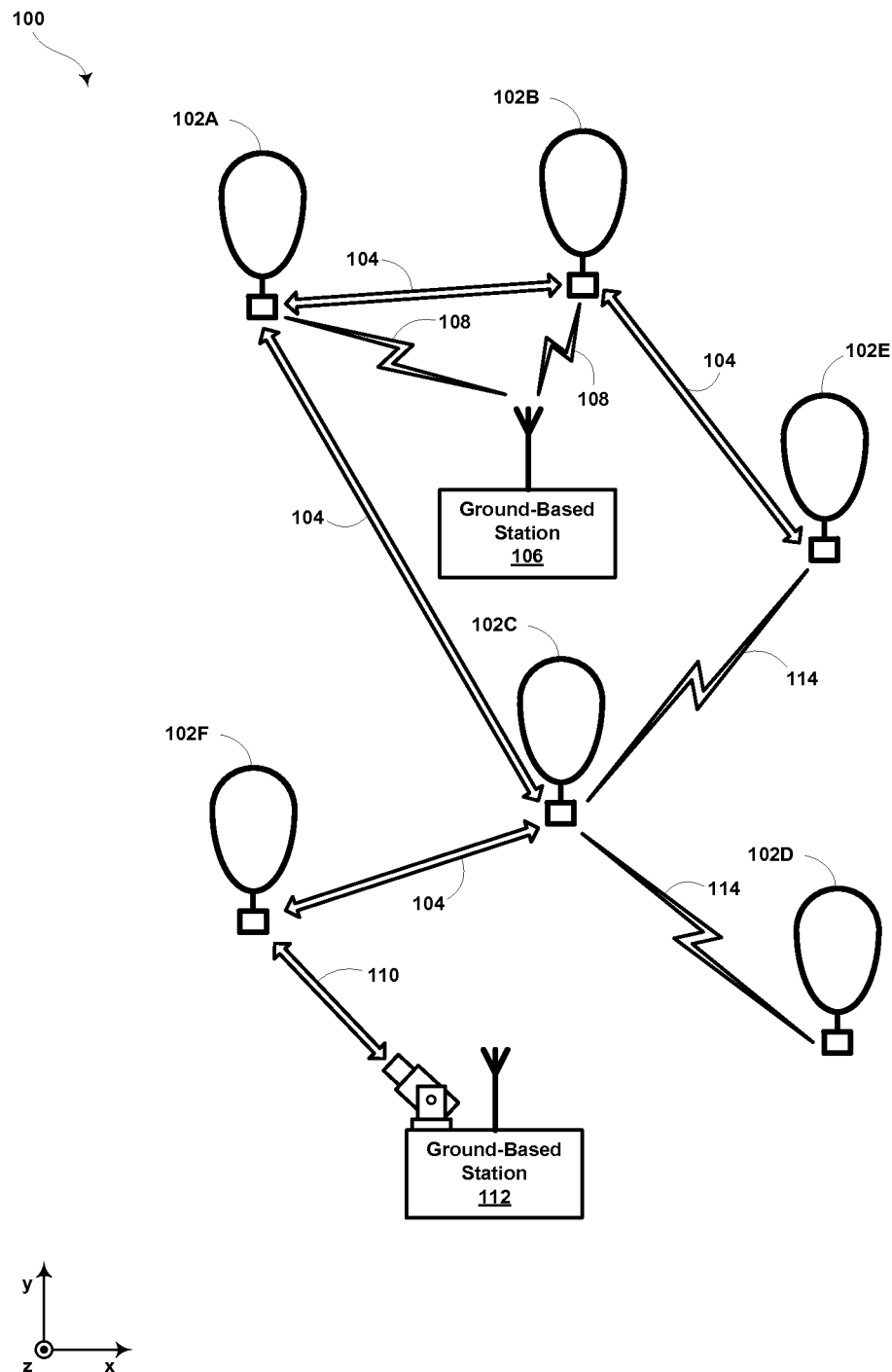
FIG. 1 is a simplified block diagram illustrating a balloon network, according to an example embodiment.

Throughout this disclosure, unless otherwise specified and/or unless the particular context clearly dictates otherwise: any usage of "a" or "an" means "at least one," and any usage of "the" means "the at least one."

Illustrative embodiments of a balloon-based positioning system are described herein and are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are contemplated herein.

1. Overview

Embodiments of a balloon-based positioning system may be integrated with a balloon data network that includes a plurality of balloons; for example, a mesh network formed by high-altitude balloons deployed in the stratosphere. Since winds in the stratosphere may affect the positions of the balloons in a differential manner, each balloon in a network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

In one balloon network, balloons may move latitudinally and/or longitudinally relative to one another so as to form a desired topology. However, keeping an individual balloon at a specific location may be difficult due to winds, and possibly for other reasons as well. Accordingly, the desired topology may define a relative framework and/or rules for positioning of balloons relative to one another, such that balloons can move with respect to the ground, while maintaining the desired topology. Thus, at a given location on earth, the particular balloon or balloons that provide service may change over time.

In one example, a balloon-based positioning system may include a group of at least three balloons and a control system. Generally, the control system may be configured to perform one or more functions related to determining a position of each balloon in the group relative to the earth. The control system may then transmit the determined positions to the respective balloons, which in turn may broadcast the determined positions such that they may be received and processed by a ground-based receiver. This may allow the ground-based receiver to determine its position relative to the earth.

In one example, the control system may determine the position of each balloon in the group relative to the earth by determining the position of each balloon in the group relative to each other balloon in the group and then determining the position of the group relative to the earth. The control system may make these determinations based on one or more spatial relationships.

A spatial relationship in this context may take a variety of forms. For example, a spatial relationship may be a distance between two objects. An object may be a balloon or a reference point that has a known position relative to the earth. Such a reference point may be, for example, a ground-based station, a celestial object, a satellite, or perhaps the earth itself. As another example, a spatial relationship may be an angle between a first vector and a second vector, where the first vector extends from a first object towards a second object, and where the second vector extends from the first object towards a third object.

In one example, the control system may then use the determined spatial relationships as constraint-optimization conditions in connection with an optimization function to determine (as an estimate) the position of each balloon in the group relative to the earth. The control system may also use balloon properties, environmental conditions, and/or other data as constraint-optimization conditions in this respect. Notably, as the control system considers more observed data, the control system may determine the position of each balloon relative to the earth with a greater level of accuracy.

As noted above, once the control system transmits the determined positions to the respective balloons, the balloons may broadcast their respective positions. In one example, each balloon may include a position-broadcasting module (PBM) configured for broadcasting a balloon signal containing balloon-positioning data. The balloon-positioning data may include the position of the respective balloon and a corresponding time of broadcast (i.e., indicating when the balloon signal was broadcast). These balloon signals may then be used by a ground-based receiver as a basis for determining its position relative to the earth. As such, the ground-based receiver may be configured to receive these balloon signals and determine its position based on the collective balloon-positioning data contained therein, such as by employing a triangulation technique.

Embodiments of a balloon-based positioning system may provide several advantages. As one example, the typical distance from a balloon to a ground-based receiver is relatively short, as compared to for example, the typical distance from a GPS satellite to a ground-based receiver. As a result, balloon signals are likely to be stronger, and are more likely to reach ground-based receivers, as compared to in a parallel GPS scenario.

As another example advantage, the balloons are positioned beneath the ionosphere. As a result, the balloon signals need not traverse the ionosphere to reach ground-based receivers, and therefore they may avoid refraction-based interference that is caused by the ionosphere. Again, this means that balloon signals are likely to be stronger, and are more likely to reach ground-based receivers, as compared to in a parallel GPS scenario where satellite signals traverse the ionosphere.

Notably, to minimize the effects of refraction-based interference, satellite signals are typically broadcast simultaneously on two different channel frequencies. Since balloon signals avoid this type of interference, they may be broadcast on a single channel frequency. Among other things, this may allow ground-based receivers to be less complex, as compared to those used in the GPS that must be configured to receive signals on multiple channels.

While not necessary, some embodiments of a balloon-based positioning system may include a large number of balloons, including thousands, tens of thousands, or more. In addition to providing additional data for determining more spatial relationships, these embodiments provide a further advantage of increasing the likelihood that a given ground-based receiver will have a direct line-of-sight with one or more of the balloons. Accordingly, balloon signals are more likely to reach ground-based receivers, as compared to in a parallel GPS scenario where the GPS is limited by its fleet of thirty-two satellites.

It should be appreciated that the possible benefits and advantages described above are merely examples and are non-limiting. Embodiments of a balloon-based positioning system may provide additional advantages, such as those described in greater detail throughout this disclosure, and/or those that would be apparent to one of ordinary skill in the art. Further, the possible benefits and advantages described are not necessarily required, and should not be construed as limiting the claims.

2. Example Balloon Networks

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with nearby balloons via free-space optical links. Further, some or all of the balloons in such a network, may also be configured to communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. Some balloons may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context.

In such a configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations. Other differences could be present between balloons in a heterogeneous balloon network.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, balloons 102A to 102F may be configured for RF communications with ground-based stations 106 and 112 via RF links 108. In another example embodiment, balloons 102A to 102F could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102F may generally be configured to operate at altitudes between 17 km and 25 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 25 km may vary with latitude and by season, the variations can be modeled in a reasonably accurate manner. Additionally, altitudes above 17 km are typically above the maximum flight level designated for commercial air traffic. Therefore, interference with commercial flights is not a concern when balloons are deployed between 17 km and 25 km. Additional advantages relating to this altitude range, particularly in connection with positioning-related features, are discussed in greater detail below.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F could be configured as a downlink balloon. Like other balloons in an example network, a downlink balloon 102F may be operable for optical communication with other balloons via optical links 104. However, downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which provides an RF link with substantially the same capacity as the optical links 104. Other forms are also possible.

Balloons could be configured to establish a communication link with space-based satellites in addition to, or as an alternative to, a ground-based communication link.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102F over an RF link 108. As such, ground-based stations 106 and 112 may be configured as an access point with which various devices can connect to balloon network 100. Ground-based stations 106 and 112 may have other configurations and/or serve other purposes without departing from the scope of the invention.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical operations involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular Quality of Service (QoS) may be employed when determining a lightpath. Other techniques are also possible.

2b) Station-Keeping Functionality

In one embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
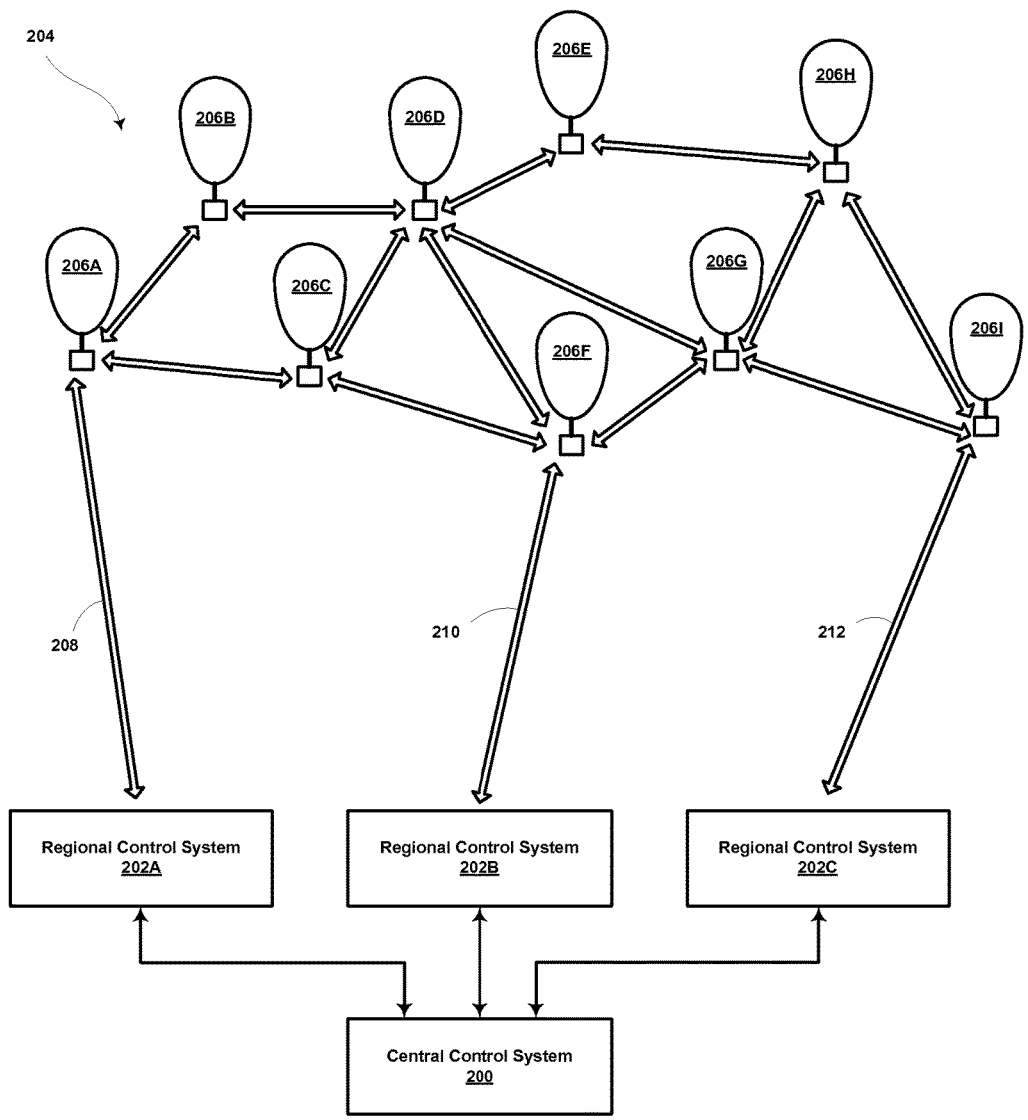
FIG. 2 is a simplified block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 208, 210, and 212, respectively.

In the illustrated configuration, where only some of balloons 206A to 206I are configured as downlink balloons, the balloons 206A, 206F, and 206I that are configured as downlink balloons may function to relay communications from central control system 200 to other balloons in the balloon network, such as balloons 206B to 206E, 206G, and 206H. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202C may in fact just be a particular type of ground-based station that is configured to communicate with downlink balloons (e.g. the ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include position data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in the balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. A distributed-control arrangement may be useful in other scenarios as well.

Further, it should be understood that other control-system arrangements are possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared between a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with a vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_I$, wherein $d_I$ is proportional to the distance to the second nearest neighbor balloon, for instance.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
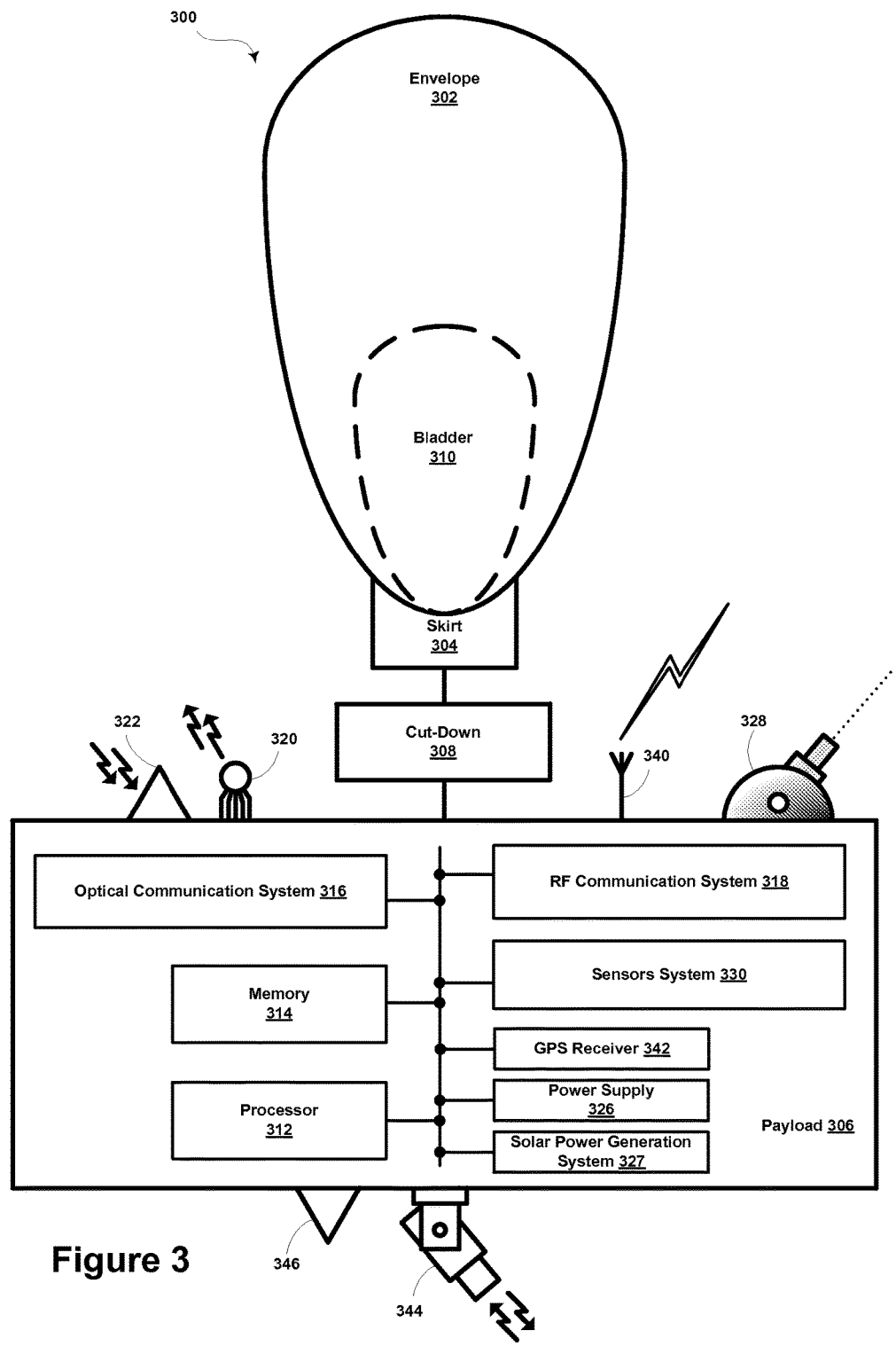
FIG. 3 is a simplified block diagram illustrating a high-altitude balloon, according to an example embodiment.

Various types of balloons may be incorporated in an example balloon network. As noted above, an example embodiment may utilize high-altitude balloons, which could typically operate in an altitude range between 17 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. In one example embodiment, the envelope and/or skirt could be made of metalized Mylar or BoPet. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an optical signal transmitter (e.g., an ultra-bright LED transmitter) 320, and which may receive optical signals via an optical signal receiver 322 (e.g., a photodiode receiver). In one example, the optical signal transmitter 320 may be configured to transmit optical signals (using a modulation technique) in a multidirectional or omnidirectional manner. Similarly, the optical signal receiver 322 may be configured to receive optical signals from a variety of different directions at a given time.

In some instances, the optical signal transmitter may take the form of a steerable optical signal transmitter (referred to herein as a "steerable transmitter") and the optical signal receiver may take the form of a steerable optical signal receiver (referred to herein as a "steerable receiver"). In one example, the steerable transmitter and steerable receiver may be integrated together as a steerable transmitter/receiver 344. The steerable transmitter may be configured to transmit optical signals in a relatively focused manner, as compared to the multidirectional or omnidirectional manners discussed above. Similarly, the steerable receiver may be configured to receive optical signals from a relatively focused direction, as compared to from a variety of different directions as discussed above.

The steerable transmitter/receiver 344 (or the steerable transmitter and/or the steerable receiver individually) may be configured to rotate about one or more axes (e.g., defining yaw and pitch Euler angle offsets). This may allow two balloons to steer their respective steerable transmitter/receiver towards each other such that the respective balloons may communicate using free-space optical links. In some instances, alignment techniques may be used to properly orient each steerable transmitter/receiver. Further, the combined use of a steerable transmitter on one balloon and an optical signal receiver on another balloon may aid in determining a particular angle-based spatial relationship as described in greater detail below.

Notably, the optical communication system 316 may be implemented in various ways (e.g., with mechanical systems and/or with hardware, firmware, and/or software) depending upon the particular application.

The payload 306 may also include a reflector (sometimes called a retro-reflector) 346 that is configured to reflect (in one or more directions) an optical signal directed at it. The combined use of a steerable transmitter on one balloon and a reflector on another balloon may also aid in determining a particular angle-based spatial relationship as described in greater detail below.

Payload 306 may also include an RF communication system 318, which may transmit and/or receive RF communications via an antenna system 340. The optical communication system 316 and/or the RF communication system 318 are examples of communication systems that may include communication interfaces for communications between a balloon and other nodes in a balloon network. It should be understood that other types of communication systems that provide other types of communication interfaces are also possible, and may vary depending upon the particular network implementation.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by power supply 326.

Further, payload 306 may include various types of other systems and sensors 328 managed by a sensor system 330. For example, payload 306 may include various motion sensors (e.g., accelerometers, magnetometers, gyroscopes, and/or compasses), altimeters (e.g., pressure, sonic, or radar-based), and/or various sensors for capturing environmental data. Further, some or all of the components within payload 306 may be implemented in a radiosonde or other probe, which may be operable to measure, e.g., pressure, altitude, geographical position (latitude and longitude), temperature, relative humidity, and/or wind speed and/or wind direction, among other information.

The balloon may further include a GPS (or other positioning system) receiver 342 that may process satellite or other types of signals received via the antenna system 340. The antenna system 340 may also be used to broadcast various types of signals. Further discussion relating to receiving and broadcasting signals, particularly in connection with positioning-related features, is provided in greater detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a ridged bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In other embodiments, in-flight balloons may be serviced by specific service balloons or another type of aerostat or aircraft.

3. Balloon Network with Optical and RF Links Between Balloons

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
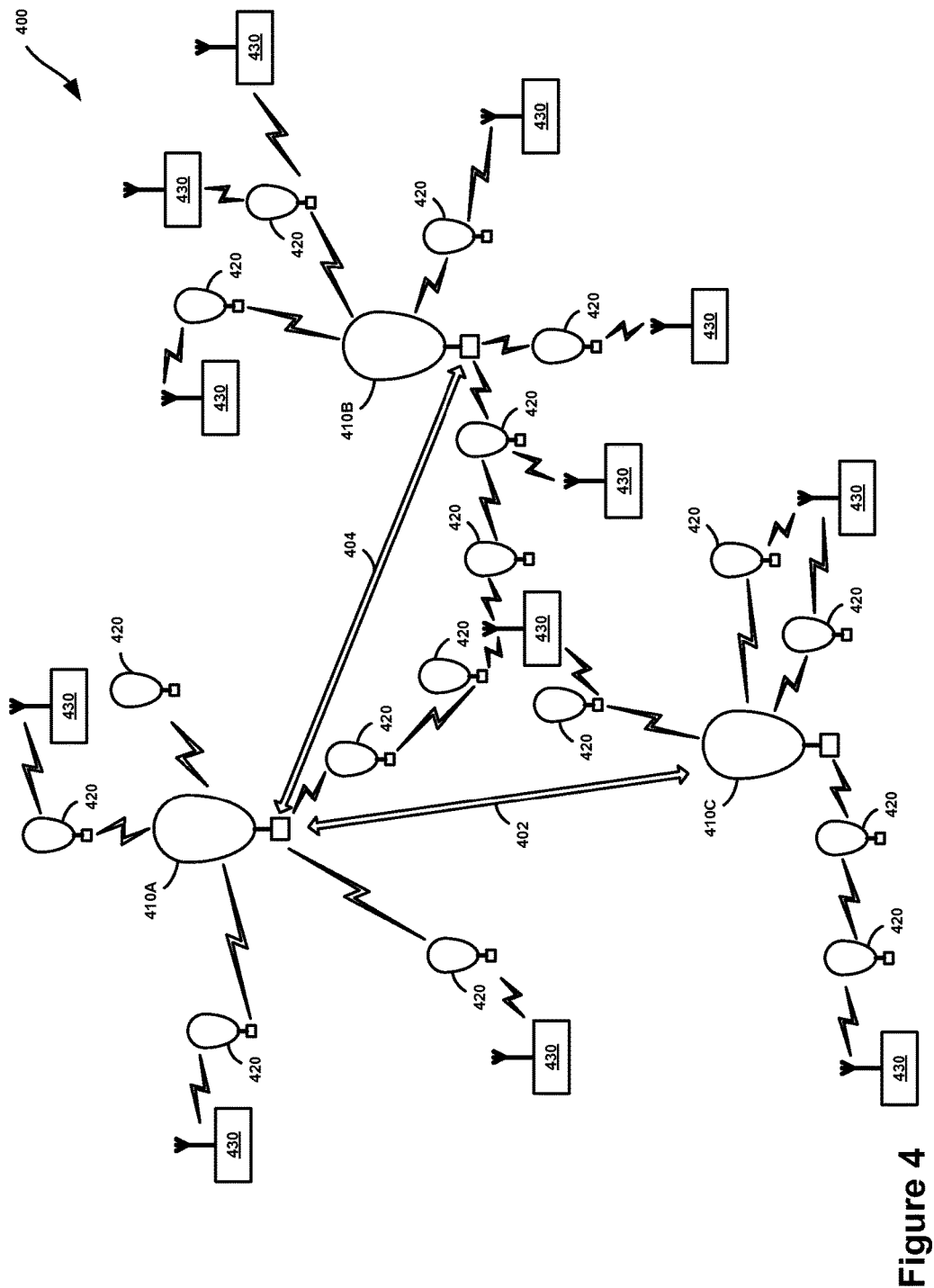
FIG. 4 is a simplified block diagram illustrating a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface. Additionally or alternatively, the sub-node may use its optical communication system to route the packet data to a ground-based station such as via a free-space optical link or via RF transmission. Notably, the ground-based station 430 may include one or more of the components described above in connection with the payload 306 of the balloon 300.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at speeds of 10 to 50 GB/sec or more.

A larger number of balloons may be configured as sub-nodes, which may communicate with ground-based Internet nodes at speeds on the order of approximately 10 MB/sec.

Configured as such, the sub-nodes 420 may be configured to connect the super-nodes 410 to other networks and/or to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

4. Example Structure of a Balloon-Based Positioning System

Figure 5:
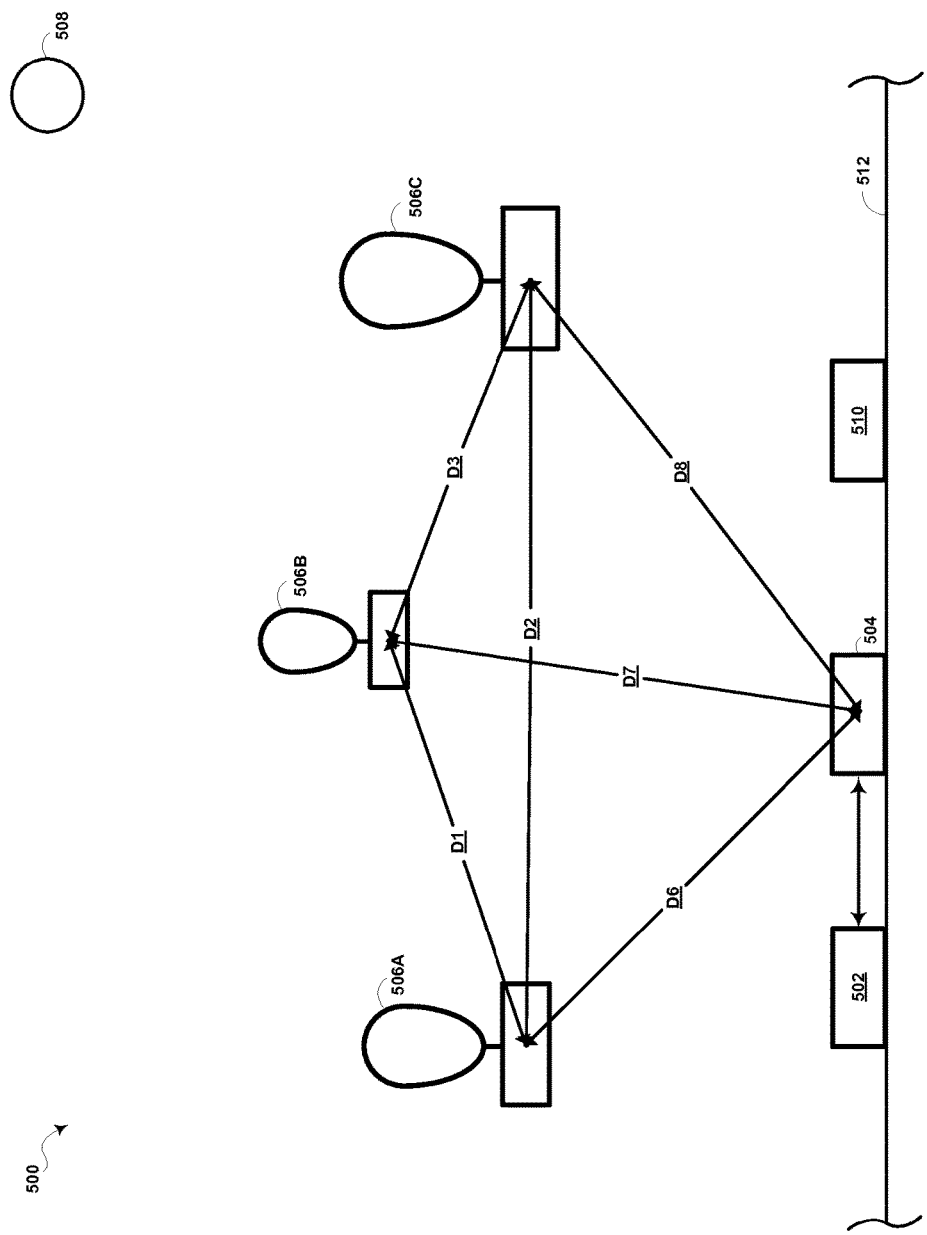
FIG. 5 is a simplified block diagram of a balloon-based positioning system, according to an example embodiment.

FIG. 5 is a simplified block diagram illustrating a balloon-based positioning system 500, according to an example embodiment. System 500 includes control system 502, ground-based station 504, a group of balloons 506A to 506C (the group is generally designated 506), celestial object 508, and ground-based receiver 510.

Control system 502 may include a processor and data storage, such as memory. And the memory may take the form of or include a non-transitory computer-readable medium having stored thereon, instructions which can be accessed and executed by the processor in order to carry out the functions described herein. Control system 502 may also have a communication system to allow it to communicate with one or more devices such as ground-based station 504. In some examples, control system 502 may be integrated with or may communicate with one or more other devices such as balloons 506A to 506C.

Ground-based station 504 may include one or more components from payload 302 of balloon 300 and may provide functionality as described above. Ground-based receiver 510 may also include one or more components from payload 302 of balloon 300 as described above. Ground-based station 510 may take a variety of forms, including for example, a mobile phone, a tablet or laptop computer, or a navigation system.

Throughout this disclosure, the term "ground-based" refers to any location on or proximate the earth's ground or surface. As such, the term is not limited to locations that are literally on the earth's ground, but may also refer to locations in buildings or even on commercial aircrafts. As shown in FIG. 5, in one example ground-based station 504 and ground-based receiver 510 may be located on the surface of earth 512.

Each balloon 506A to 506C may include one or more components from balloon 300 as described above. Finally, celestial object 508 may take various forms, including for example a planet, a moon, or a star (e.g., the sun).

Notably, system 500 has been provided for illustration purposes only and is not meant to be limiting. Indeed, while not necessary, some embodiments of a balloon-based positioning system may include a large number of balloons, including thousands, tens of thousands, or more, perhaps spanning around the entire earth Likewise, such a system may include a large number of control stations, ground-based stations, celestial objects, and/or ground-based receivers.

5. Example Operation of a Balloon-Based Positioning System

Figure 6:
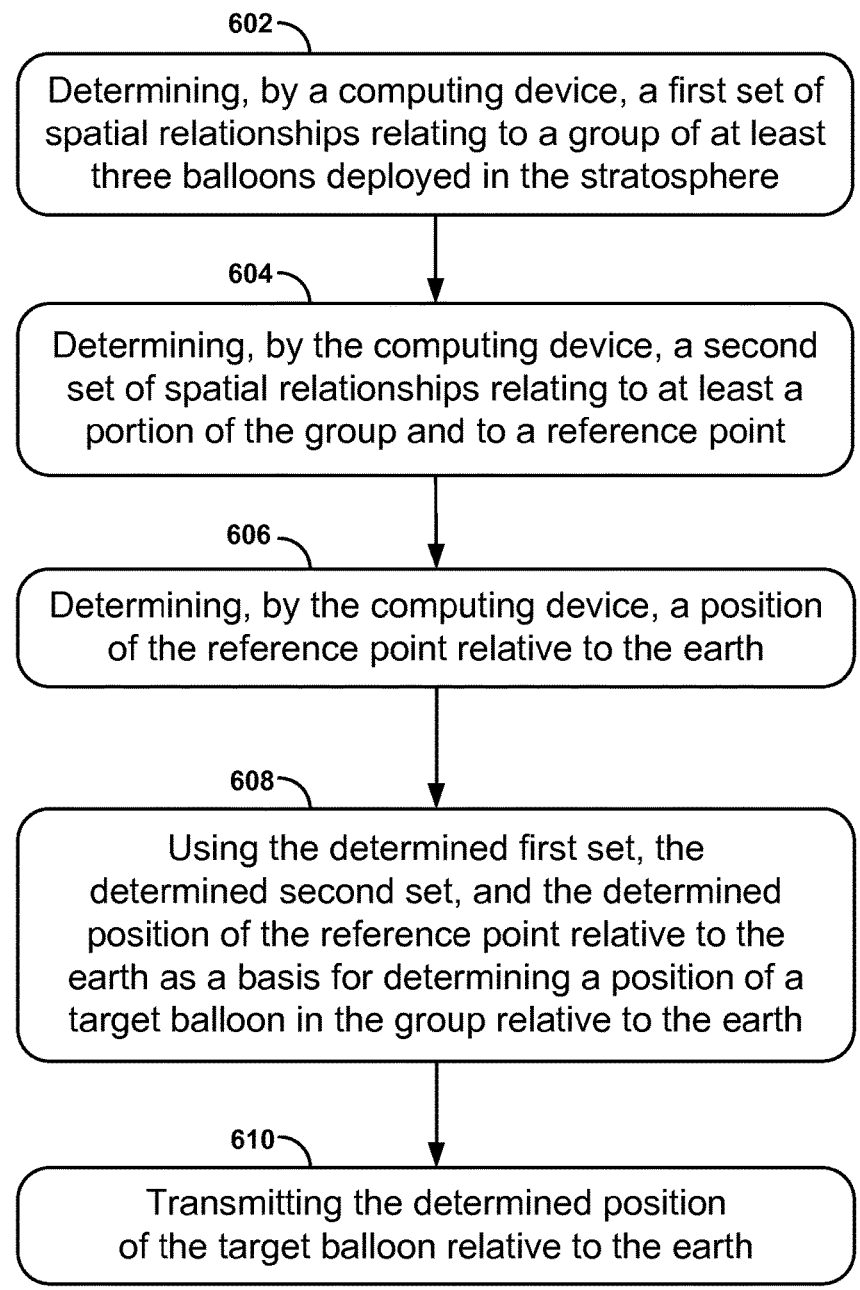
FIG. 6 is a flow chart showing functions of a method, according to an example embodiment.

FIG. 6 is a flow chart illustrating example functions of a method, according to an example embodiment. Generally, at block 602, the method may involve determining, by a computing device, a first set of spatial relationships relating to a group of at least three balloons deployed in the stratosphere. At block 604, the method may involve determining, by the computing device, a second set of spatial relationships relating to at least a portion of the group and to a reference point. Further, at block 606, the method may involve determining, by the computing device, a position of the reference point relative to the earth. Still further, at block 608, the method may involve using the determined first set, the determined second set, and the determined position of the reference point relative to the earth as a basis for determining a position of a target balloon in the group relative to the earth. And at block 610, the method may involve transmitting the determined position of the target balloon relative to the earth. Additional details relating to these functions are provided below. For illustration purposes, the functions are described in connection with system 500. However, the functions may also be implemented in other systems (e.g., balloon-based positioning systems of a larger scale).

5a) Determining a First Set of Spatial Relationships Relating to the Group

As noted above, at block 602, the method may involve determining, by a computing device, a first set of spatial relationships relating to a group of at least three balloons deployed in the stratosphere. This may involve control system 502 determining a first set of spatial relationships relating to group 506. Generally, this first set of spatial relationships defines the geometry of group 506.

The spatial relationships in the first set may take various forms. For example, the spatial relationships may be distance-based. As such, control system 502 determining the first set of spatial relationships may involve control system 502 determining a distance between a balloon in group 506 and another balloon in group 506. As shown in FIG. 5, this may involve control system 502 determining distance D1 between balloons 506A and 506B, distance D2 between balloons 506A and 506C, and/or distance D3 between balloons 506B and 506C.

Control system 502 may determine such distances in a variety of ways. For example, control system 502 may determine distance D1 based on the "time of flight" of a signal traveling from balloon 506A to balloon 506B. This may involve several functions. A first function may involve control system 502 determining a transmission time of a signal sent by balloon 506A and received by balloon 506B. In one example, balloon 506A may encode the transmission time in the signal. Balloon 506B may then extract the transmission time from the signal and provide it to control system 502. A second function may involve control system 502 determining a receipt time of the signal by balloon 506B. In one example, balloon 506B may record the time at which it receives the signal, and provide it to control system 502. A third function may involve control system 502 determining a travel speed of the signal (e.g., via a look-up table). And a fourth function may involve control system 502 using the determined transmission time, the determined receipt time, and the determined travel speed as a basis for determining the distance between balloon 506A and balloon 506B, such as by solving for distance as a function of time and speed. For example, control system 502 may determine distance D1 by determining the difference between the determined transmission time and the determined receipt time, and multiplying the determined difference by the determined travel speed of the signal.

Figure 7:
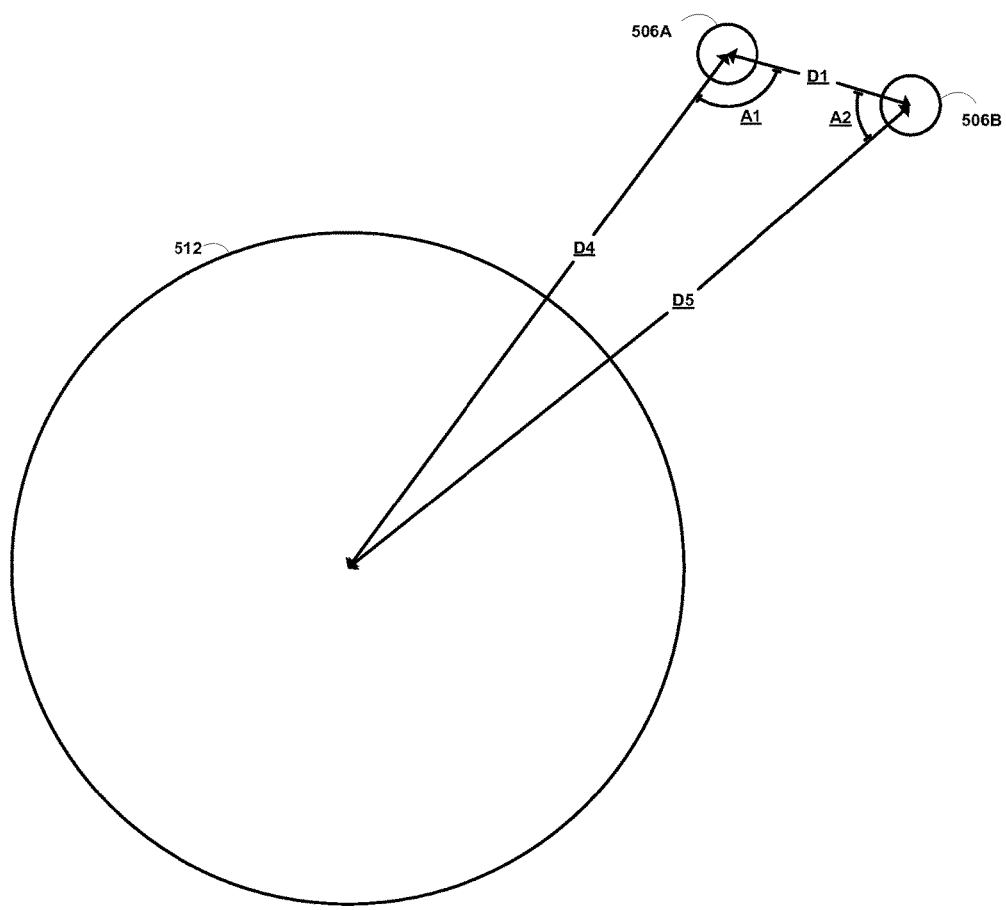
FIG. 7 is an alternate depiction of a portion of the system of FIG. 5.

As another example, control system 502 may determine distance D1 based on other distances and/or angles as shown in connection with FIG. 7. This may involve several functions. A first function may involve control system 506A determining distance D4 between balloon 506A and earth 512 (i.e., the center of earth 512). In one example, balloon 506A may use an altimeter to determine its altitude and provide it to control system 502. Control system 502 may then determine the distance from the surface of earth 512 (under balloon 506A) to the center of earth 512 (e.g., via a look-up table) and add that distance to the altitude to determine distance D4. A second function may involve control system 502 determining angle A1 between a first vector and a second vector, where the first vector extends from balloon 506A towards earth 512, and where the second vector extends from balloon 506A towards balloon 506B. A third function may involve determining angle A2 between the second vector and a third vector, where the third vector extends from balloon 506B towards earth 512. Example ways in which such angles may be determined are described in greater detail below.

A fourth function may involve control system 502 using the determined distance D4, the determined angle A1, and the determined angle A2 as a basis for determining the distance D1, such as by solving a sine function. Additionally or alternatively, control system 502 may determine distance D5 between balloon 506B and earth 512. And control system 502 may use the determined distance D4, the determined distance D5, the determined angle A1, and the determined angle A2 as a basis for determining distance D1, such as by solving a cosine function.

As yet another example, control system 502 may determine distance D1 based on a change of an RF signal's strength between when it is received by a first antenna and when it is received by a second antenna, where the RF signal is broadcast from balloon 506A, and where both antennas extend from different portions of balloon 506B.

Additionally or alternatively to determining distance D1, control system 502 may determine other distances in similar manners. For example, control system 502 may determine distance D2 and/or distance D3, and therefore the first set of spatial relationships may include distances D1, D2, and/or D3.

In some instances, a distance-based spatial relationship may specify a distance range between two objects. For example, if balloon 506A determines that it is within RF communication range of balloon 506B, balloon 506A may determine that distance D1 is within a distance range having an upper limit equal to the maximum distance that an RF signal may travel. A similar technique may also be used for balloons that communicate using optical signals. Further, balloon 506A may use the received strength of a signal send from balloon 506B to further narrow the range of distance D1.

Additionally or alternatively to determining a range of distance D1, control system 502 may determine other distance ranges in similar manners. For example, control system 502 may determine a range of distance D2 and/or a range of distance D3, and therefore the first set of spatial relationships may include ranges of distances D1, D2, and/or D3.

Figure 8:
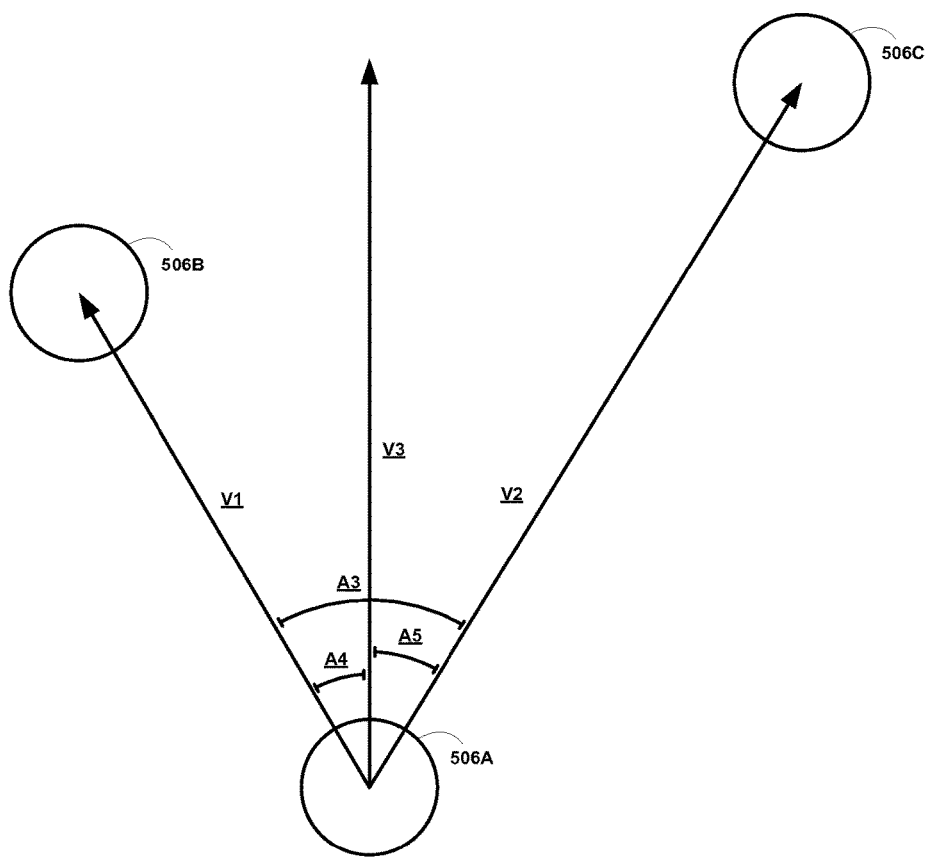
FIG. 8 is another alternate depiction of a portion of the system of FIG. 5.

The spatial relationships may also be angle-based. In one example, control system 502 determining the first set of spatial relationships may involve control system 502 determining an angle between a first vector and a second vector, where the first vector extends from a first balloon in the group 500 towards a second balloon in the group 500, and where the second vector extends from the first balloon towards a third balloon in the group 500. As shown in FIG. 8, this may involve control system 502 determining angle A3 between vectors V1 and V2.

Control system 502 determining angle A3 may involve several functions. A first function may involve control system 502 determining angle A4 between vector V1 and a reference vector V3, where vector V3 extends from balloon 506A. A second function may involve control system 502 determining angle A5 between vector V2 and vector V3. A third function may involve control system 502 using the determined angle A4 and the determined angle A5, as a basis for determining angle A3. For example, where the angles A4 and A5 have different signs (relative to the vector V3), control system 502 may determine angle A3 to be the sum of the magnitude of the angles A4 and A5. Alternatively, where the angles A4 and A5 have the same signs (relative to the vector V3), control system 502 may determine angle A3 to be the difference of the magnitudes of the angles A4 and A5.

Control system 502 may determine angles A4 and A5 in a variety of ways. In one example, balloon 506A may determine angle A4 and provide it to control system 502. This may involve several functions. A first function may involve balloon 506A emitting an optical signal via a steerable transmitter in a first position. A second function may involve balloon 506A detecting a reflection of the emitted optical signal (e.g., using an imaging system). A third function may involve responsive to detecting the reflection of the emitted optical signal, balloon 506A determining an offset between the first position and a second position of the steerable transmitter, where in the second position, the steerable transmitter is aligned with vector V3. And a fourth function may involve balloon 506A determining angle A4 using the determined offset (e.g., via a lookup table that maps offsets to angles).

Additionally or alternatively, balloon 506A may determine angle A4 based on the receipt of a confirmation message from balloon 506B, and balloon 506A may then provide angle A4 to control system 502. This may involve several functions. A first function may involve balloon 506A scanning the sky while emitting an optical signal that encodes the current position of the steerable transmitter. As such, balloon 506A may transmit an optical signal via a steerable optical signal transmitter in a first position, where the optical signal includes the first position, and where the optical signal is directed at balloon 506B. In response to receiving this signal, balloon 506B may send to balloon 506A a message indicating that when the steerable transmitter was in the first position balloon 506B received the optical signal. A second function may therefore involve balloon 506A receiving the message from balloon 506B. A third function may involve responsive to balloon 506A receiving the message, balloon 506A determining an offset between the first position and a second position of the steerable transmitter, where in the second position, the steerable transmitter is aligned with the vector V3. A fourth function may involve balloon 506A determining angle A4 using the determined offset.

Additionally or alternatively, balloon 506A may determine angle A4 by analyzing an image including balloon 506B. This may involve several functions. A first function may involve balloon 506A using an imaging system to take an image of the sky. A second function may involve balloon 506A determining that balloon 506B is in the image at a first position. A third function may involve responsive to determining that balloon 506B is in the image at a first position, balloon 506A determining an offset between the first position and a second position, where the second position represents a position in the image of reference vector V3. A fourth function may involve balloon 506A determining angle A4 using the determined offset.

Notably, control system 502 may also determine angle A5 using one or more of the techniques described above in connection with determining angle A4. Then, after determining angles A4 and A5, control system 502 may determine angle A3 as described above.

Additionally or alternatively to determining angle A3, control system 502 may determine other angles related to the group 506 in similar manners. For example, control system 502 may determine an angle between a first vector extending from balloon 506B towards balloon 506A and a second vector extending from balloon 506B towards balloon 506C. Likewise, control system 502 may determine an angle between a first vector extending from balloon 506C towards balloon 506B and a second vector extending from balloon 506C towards balloon 506A. Accordingly, the first set of spatial relationships may include one or more of such angles.

5b) Determining a Second Set of Spatial Relationships Relating to at Least a Portion of the Group and to a Reference Point As noted above, at block 604, the method may involve determining, by the computing device, a second set of spatial relationships relating to at least a portion of the group and to a reference point. This may involve control system 502 determining a second set of spatial relationships relating to at least a portion of the group 506 and to a reference point such as ground-based station 504 or celestial object 508. Generally, the second set of spatial relationships defines the orientation of the group 506 relative to earth 512.

As with those in the first set, the spatial relationships in the second set may take various forms and may be distance-based. For example, as shown in FIG. 5, spatial relationships in the second set may include distance D6 between balloon 506A and ground-based station 504, distance D7 between balloon 506B and ground-based station 504, and/or distance D8 between balloon 506C and ground-based station 504.

As noted above, ground-based station 504 may include one or more of the components of payload 300 of balloon 300. Accordingly, control system 502 may determine such distances using the similar techniques to those described above in connection with the first set of spatial relationships. For example, control system 502 may determine the time of flight of a signal traveling from one of the balloons 506A to 506C to ground-based station 504 and visa-versa. Additionally or alternatively, control system 502 may determine such distances based on a change of an RF signal's strength as described above. Also as with those in the first set, the spatial relationships in the second set may specify a distance range. Also, in some examples, one of balloons 506A to 502C or ground-based station 504, may determine a distance or distance range and provide it to control system 502.

Figure 9:
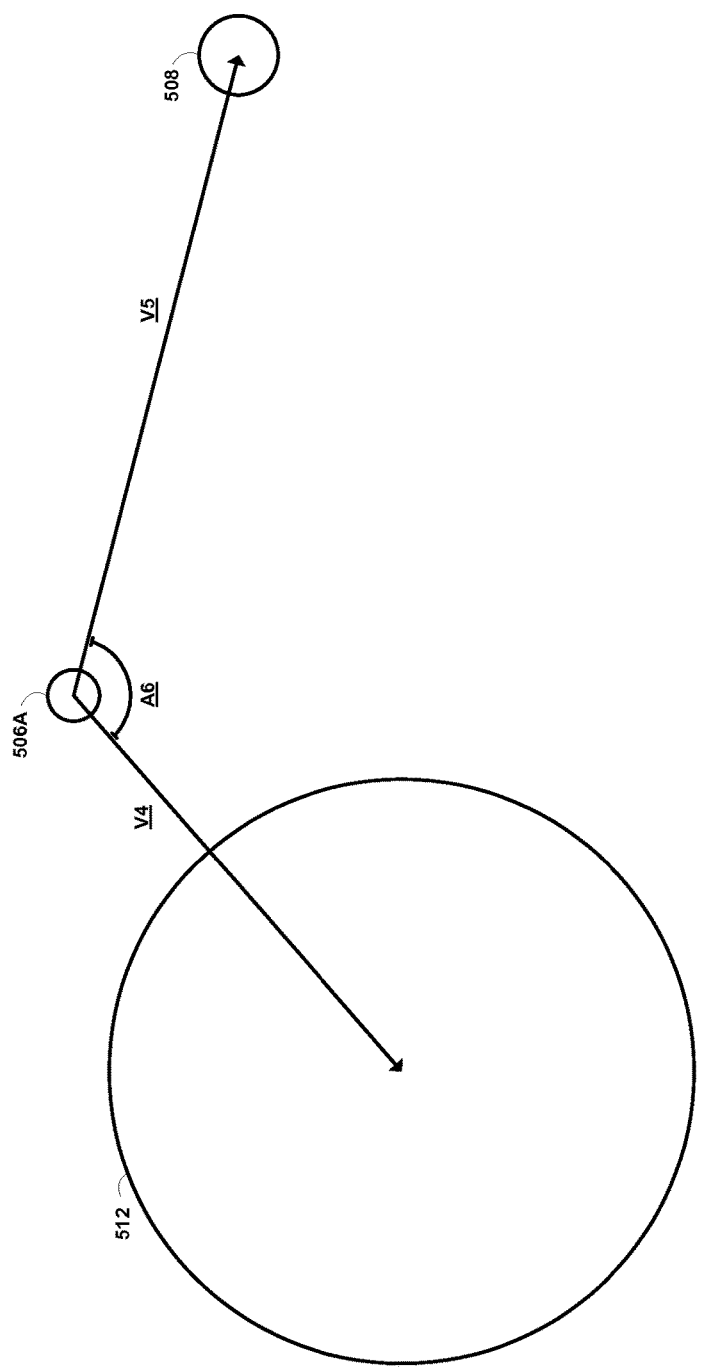
FIG. 9 is again another alternate depiction of a portion of the system of FIG. 5.

Further as with those in the first set, the spatial relationships in the second set may be angle-based. For example, the second set may include an angle between a first vector and a second vector, where the first vector extends from balloon 506A towards earth 512, and where the second vector extends from balloon 506A towards celestial object 508. As shown in FIG. 9, this may involve control system 502 determining angle A6 between vectors V4 and V5. In one example, balloon 506A may determine angle A6 using techniques similar to those described above in connection with balloon 506A determining angle A4, and provide it to control system 502.

Figure 10:
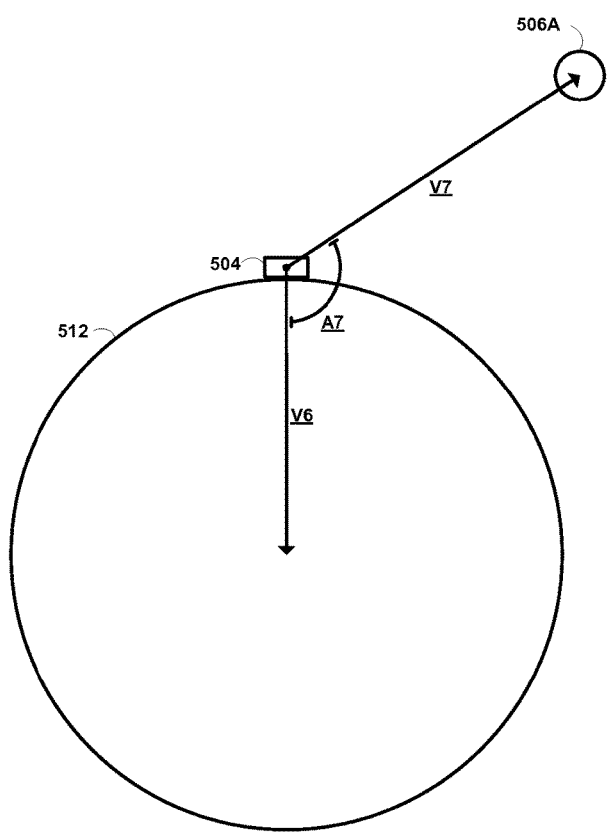
FIG. 10 is still another alternate depiction of a portion of the system of FIG. 5.

As another example, the second set may include an angle between a first vector and a second vector, where the first vector extends from ground-based station 504 towards earth 512, and where the second vector extends from ground-based station 504 towards balloon 506A. As shown in FIG. 10, this may involve control system 502 determining angle A7 between vectors V6 and V7. In one example, ground-based station 504 may determine angle A7 using techniques similar to those described above in connection with balloon 506A determining angle A4, and provide it to control system 502.

Figure 11:
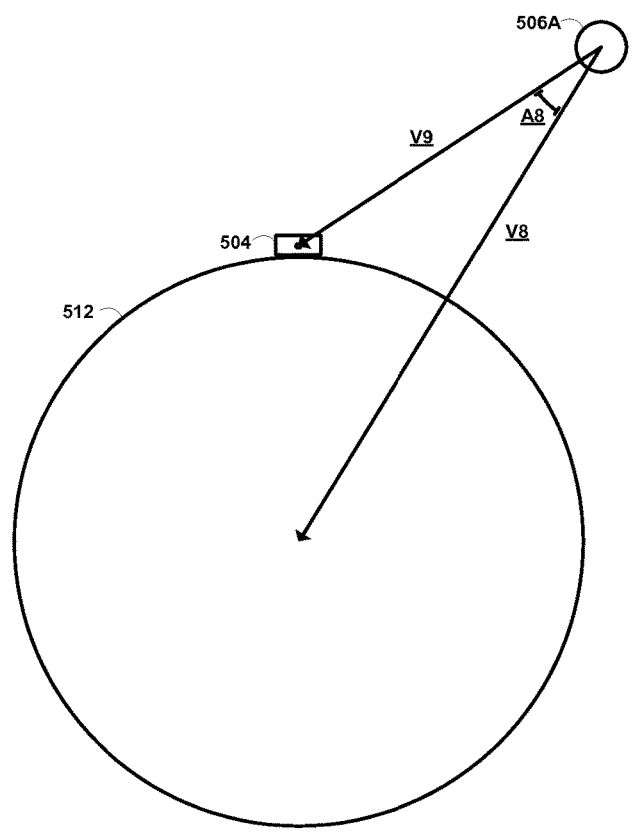
FIG. 11 is yet another alternate depiction of a portion of the system of FIG. 5.

As yet another example, the second set may include an angle between a first vector and a second vector, where the first vector extends from balloon 506A towards earth 512, and where the second vector extends from balloon 506A towards ground-based station 504. As shown in FIG. 11, this may involve control system 502 determining angle A8 between vectors V8 and V9. In one example, balloon 506A may determine such an angle using one or more of the techniques described above in connection with balloon 506A determining angle A4, and provide it to control system 502.

5c) Determining a Position of the Reference Point Relative to the Earth

As noted above, at block 606, the method may involve determining, by the computing device, a position of the reference point relative to the earth. This may involve control system 502 determining a position of ground-based station 504, celestial object 508, or another object relative to earth 512. In one example, control system 502 may make this determination by identifying the reference point and retrieving the position of the identified reference point from a lookup table. In one example, balloon 506A may identify a reference point and provide it to control system 502. Balloon 506A may identify a reference point in a variety of ways. For instance, where the reference point is celestial object 508, balloon 506A may identify celestial object 508 using an imaging system (e.g., that uses "star tracker" technology). Where the reference point is ground-based station 504, balloon 506A may identify the ground-based station 504 using an imaging system and/or based on a reference point identifier broadcast by ground-based station 504.

5d) Determining a Position of a Target Balloon Relative to the Earth

As noted above, at block 608, the method may involve using the determined first set, the determined second set, and the determined position of the reference point relative to the earth as a basis for determining a position of a target balloon in the group relative to the earth. This may involve control system 502 using the determined first set, the determined second set, and the determined position of ground-based station 504 and/or celestial object 508 as a basis for determining a position of balloon 506A.

Since the determined spatial relationships inherently have at least some degree of measurement uncertainty, in one example control system 502 may use the spatial relationships in the determined first set and the determined second set as constraint-optimization conditions in connection with an optimization function. The optimization function may employ any of a variety of optimization techniques to determine (i.e., optimize) the position of balloon 506A. Such techniques may include minimum mean square error (MMSE), simultaneous localization and mapping (SLAM) (although without the mapping component), partially-observable Markov design, linear quadratic estimation, dynamic Bayesian network estimation, and/or convex optimization. In some instances, temporal-based optimization functions may also be used (i.e., that take into account a change in spatial relationships over time).

By using one or more of these optimization functions, control system 502 may determine the most likely position of balloon 506A relative to earth 512 in view of the determined first and second sets of spatial relationships. In practice, control system 502 may determine the position of each balloon (or at least multiple balloons) in group 506 relative to earth 512 using a similar process. As such, control system 502 may determine the position of balloons 506B and 506C relative to earth 512.

Control system 502 may also use balloon properties, environmental conditions, and/or other data as constraint-optimization conditions in this respect. For instance, in a balloon-based positioning system that extends around the earth, the continuous or "closed-loop" nature of the group of balloons may be used as such a condition. This may provide a benefit that is not available in other environments in which measurement errors may accumulate over long distances. Indeed, in such a closed-loop system, control system 502 may self-correct errors that would otherwise accumulate over such distances.

In one example, control system 502 may separately determine the position of each balloon in group 506 relative to each other balloon in group 506, and the position of group 506 relative to earth 512. As such, the function at block 608 may involve control system 502 using the determined first set as a basis for determining for each balloon in group 506 a position relative to the remaining balloons in group 506, and control system 502 using the determined positions relative to the remaining balloons, the determined second set, and the determined position of the reference point relative to earth 512 as a basis for determining the position of the target balloon relative to earth 512.

In some instances, control system 502 may use a first optimization function to determine for each balloon in the group 506 the position relative to the remaining balloons in the group, and a second optimization function to determine the position of the target balloon relative to the earth 512.

5e) Transmitting the Determined Position of the Target Balloon Relative to the Earth As noted above, at block 610, the method may involve transmitting the determined position of the target balloon relative to the earth. This may involve control system 502 transmitting the determined position of balloon 506A relative to earth 512 to balloon 506A. In another example, control system 502 may provide the determined position to ground-based station 504, and ground-based station 504 may transmit the determined position to balloon 506A. Balloon 506A may then broadcast or otherwise transmit the determined position and other relevant data for use by ground-based receiver 510. These functions may also be performed with respect to other balloons in the group, including for example, balloons 506B and 506C.

Figure 12:
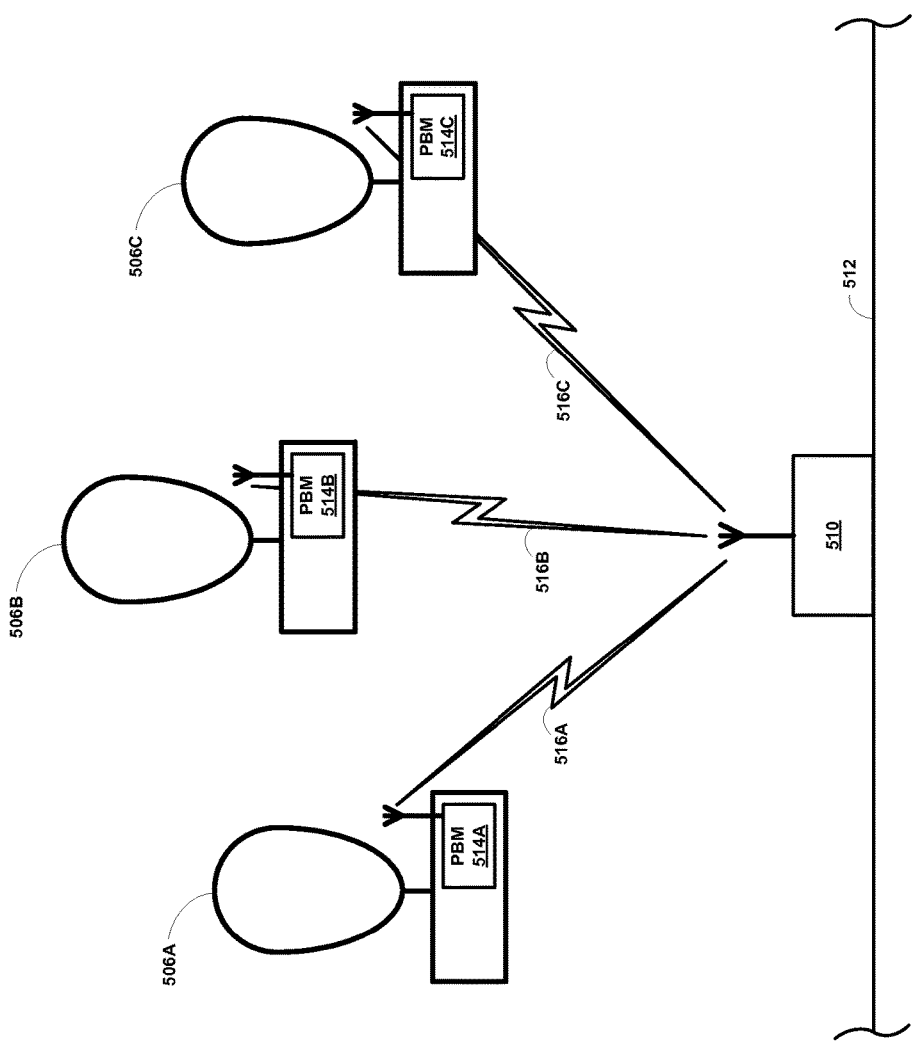
FIG. 12 is even another alternate depiction of a portion of the system of FIG. 5.

As shown in FIG. 12, each balloon 506A to 506C may include a respective PBM 514A to 514C configured for broadcasting (e.g., via an antenna) a respective balloon signal 516A to 516C containing balloon-positioning data. The balloon-positioning data includes the determined position of the respective balloon and a corresponding time of broadcast (i.e., indicating when the balloon signal was broadcast). Ground-based receiver 510 may be configured to receive one or more of balloon signals 516A to 516C and determine its position relative to earth 512 based on the collective balloon-positioning data contained therein.

As used in this disclosure, a PBM is a functional module that refers to one or a group of components contained in the respective balloon, such as those described in connection with FIG. 3, that may carry out the described functions. For example, the PBM may include a particular set of instructions stored in the memory 314 that relate to the function of broadcasting a position of the respective balloon relative to the earth, together with the processor 312 for executing those instructions, and any communication systems or other associated components. However, a PBM is not limited to any particular set of components.

Notably, in some embodiments, each PBM may broadcast the respective balloon signal on a single channel frequency. This provides a particular advantage over traditional positioning systems, such as the GPS, where satellite signals are typically broadcast simultaneously on two different channel frequencies (typically L1 at 1575.42 Mhz and L2 at 1227.6 Mhz) for the purpose of attempting to detect and remove delay caused by refraction-based interference. Due to the altitude of GPS satellites, satellite signals sent directly to ground-based receivers traverse the ionosphere, and therefore are subject to this type of interference.

Since GPS satellites broadcast signals on two channel frequencies, traditional GPS receivers must be configured to receive both channel frequencies. On the other hand, in embodiments of the balloon-based positioning system where balloon signals are transmitted on a single channel frequency, the corresponding ground-based receiver need only be configured to receive a single channel frequency. Among other things, this allows ground-based receivers to be less complex, and therefore, typically less expensive to produce. Notably, the single channel frequency that is used may be any particular frequency, although in select embodiments, it may differ from the frequencies of the L1 and L2 or other commonly used frequencies to reduce or avoid potential interference.

Further, due to the relatively slow speed at which the balloons are likely to travel (i.e., as compared to GPS satellites), ground-based receivers do not need to compensate for Doppler shifts as is the case with GPS receivers. Again, this reduces the complexity and the production cost of ground-based receivers.

5f) Variations

While one or more functions of the disclosed methods have been described as being performed by the certain entities (e.g., control system 502), the functions may be performed by any entity or combination of entities, such as those included in system 500 described above.

Also, as noted above, the disclosed system need not be limited to the configuration of system 500. Indeed, in practice the disclosed system may include thousands, tens of thousands, or even more balloons, control systems, ground-based stations, celestial objects, ground-based receivers, and/or other entities. Likewise, the method may involve determining thousands, tens of thousands, or even more spatial relationships such as in the example manners described above. Notably, as more spatial relationships are determined, the control system may be able to determine the position of a target balloon with greater accuracy and with less calculation time. As such, in some embodiments, a large-scale balloon-based positioning system may be desired.

Further, the described steps throughout this application need not be performed in the disclosed order, although in some examples, an order may be preferred. Also, not all steps need to be performed to achieve the desired advantages of the disclosed systems and methods, and therefore not all steps are required. Further, the variations described throughout this disclose may be applied to any of the disclosed examples and perhaps in other environments.

Still further, the various techniques described throughout this application may be utilized in environments other than a balloon-based positioning system. For example, the described techniques for determining a distance between two balloons may be used to determine the distance between two other objects. Likewise, the described techniques for determining an angle between two vectors need not be utilized in the context of a balloon-based positioning system. Indeed, the first vector may extend from a first object to a second object and the second vector may extend from the first object to a reference point (e.g., a third object). As such, it is contemplated that a control system (or other device) may determine spatial relationships between other (non-balloon) objects. Notably, these objects may include one or more of the balloon components described above, and such components may be used, at least in part, in determining such spatial relationships. Then, based on these spatial relationships, a control system (or other device) may determine the position of each object relative to one or more other objects and/or relative to a reference point such as the earth in a manner similar to that described above in connection with the example balloon-based positioning systems.

6. Additional Example Advantages

In the context of the GPS, a receiver is often unable to determine its position because it cannot receive the signals being broadcast by one or more of the GPS satellites. These signals may have difficulty reaching GPS receivers for a number of reasons, such as due to weak signal strength and signal interference due to reflection, refraction, and/or multipath propagation. In an attempt to minimize issues concerning weak signal strength, the GPS employs a digital-sequence spread spectrum (DSSS) encoding technique that improves signal strength by utilizing an increased amount of bandwidth. However, this technique only marginally improves signal strength.

As noted, GPS satellites typically orbit the earth at an altitude of approximately 20,000 km. As a result of the satellite signals traveling such a long distance, signal attenuation is often substantial, even with DSSS encoding. On the other hand, in the balloon-based positioning system, balloon signals sent from a balloon to a ground-based receiver travel a substantially shorter distance. In one embodiment, balloon signals travel a distance in the range of approximately 17 km to 25 km. Further, balloon signals destined for a receiver originate beneath the ionosphere, and therefore are not subject to refraction-based interference as discussed above. For these reasons, balloon signals are likely to be stronger, and are more likely to reach receivers, as compared to in a parallel GPS scenario.

Finally, when a given GPS receiver is in certain environments such as cities, tall buildings or other objects may block or interfere with the signals. As discussed, some embodiments of the balloon-based positioning system may include a large number of balloons deployed across the stratosphere. Some embodiments may include thousands, tens of thousands, or even more balloons. As a result, any given ground-based receiver is likely to have a line-of-sight to many balloons, in some embodiments, as many as 50-100 at a time. As a result, a receiver has a much greater likelihood of being able to receive balloon signals, as compared to for example, a GPS receiver that may have lines-of-sight with a maximum of approximately eleven or twelve GPS satellites.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   determining, by a computing device, a first set of spatial relationships relating to a group of at least three balloons deployed in the stratosphere, wherein determining the first set comprises (i) determining a distance between a balloon in the group and another balloon in the group, and (ii) determining an angle between a first vector and a second vector, wherein the first vector extends from a first balloon in the group towards a second balloon in the group, and wherein the second vector extends from the first balloon towards a third balloon in the group;
   determining, by the computing device, a second set of spatial relationships relating to at least a portion of the group and to a reference point;
   determining, by the computing device, a position of the reference point relative to the earth;
   using the determined first set, the determined second set, and the determined position of the reference point relative to the earth as a basis for determining a position of a target balloon in the group relative to the earth; and
   transmitting the determined position of the target balloon relative to the earth,
   wherein using the determined first set, the determined second set, and the determined position of the reference point relative to the earth as a basis for determining the position of the target balloon relative to the earth comprises using an optimization function to determine the position of the target balloon relative to the earth.

2. The method of claim 1, wherein using the determined first set, the determined second set, and the determined position of the reference point relative to the earth as a basis for determining the position of the target balloon relative to the earth comprises:
   using the determined first set as a basis for determining for each balloon in the group a position relative to the remaining balloons in the group; and
   using the determined positions relative to the remaining balloons, the determined second set, and the determined position of the reference point relative to the earth as a basis for determining the position of the target balloon relative to the earth.

3. The method of claim 2, wherein using the determined first set as a basis for determining for each balloon in the group the position relative to the remaining balloons in the group comprises using a first optimization function to determine for each balloon in the group the position relative to the remaining balloons in the group,
   and wherein using the determined positions relative to the remaining balloons, the determined second set, and the determined position of the reference point relative to the earth as a basis for determining the position of the target balloon relative to the earth comprises using a second optimization function to determine the position of the target balloon relative to the earth.

4. The method of claim 1, wherein determining the distance between the balloon in the group and another balloon in the group comprises:
   determining a transmission time of a signal sent by the balloon and received by the other balloon;

determining a receipt time of the signal by the other balloon;
determining a travel speed of the signal; and
using the determined transmission time, the determined receipt time, and the determined travel speed as a basis for determining the distance between the balloon and the other balloon.

5. The method of claim 1, wherein determining the distance between the balloon in the group and another balloon in the group comprises:
determining a distance between the balloon and the earth;
determining an angle between a third vector and a fourth vector, wherein the third vector extends from the balloon towards the earth, and wherein the fourth vector extends from the balloon towards the other balloon;
determining an angle between the fourth vector and a fifth vector, wherein the fifth vector extends from the other balloon to the earth; and
using the determined distance between the balloon and the earth, the determined angle between the third vector and the fourth vector, and the determined angle between the fourth vector and the fifth vector as a basis for determining the distance between the balloon and the other balloon.

6. The method of claim 1, wherein determining the angle between the first vector and the second vector comprises:
determining an angle between the first vector and a third vector, wherein the third vector extends from the first balloon;
determining an angle between the second vector and the third vector; and
using (i) the determined angle between the first vector and the third vector and (ii) the determined angle between the second vector and the third vector, as a basis for determining the angle between the first vector and the second vector.

7. The method of claim 6, further comprising:
the first balloon emitting an optical signal via a steerable optical signal transmitter in a first position;
the first balloon detecting a reflection of the emitted optical signal; and
responsive to the first balloon detecting the reflection of the emitted optical signal, the first balloon determining an offset between the first position and a second position of the steerable optical signal transmitter, wherein in the second position, the steerable optical signal transmitter is aligned with the third vector,
wherein determining the angle between the first vector and the third vector comprises using the determined offset as a basis for determining the angle between the first vector and the third vector.

8. The method of claim 6, further comprising:
the first balloon transmitting an optical signal via a steerable optical signal transmitter in a first position, wherein the optical signal includes the first position;
the first balloon receiving from the second balloon, a message indicating that when the steerable optical signal transmitter was in the first position the second balloon received the optical signal; and
responsive to the first balloon receiving the message, the first balloon determining an offset between the first position and a second position of the steerable optical signal transmitter, wherein in the second position, the steerable optical transmitter is aligned with the third vector,
wherein determining the angle between the first vector and the third vector comprises using the determined offset as a basis for determining the angle between the first vector and the third vector.

9. The method of claim 1, wherein the reference point comprises a celestial object, and wherein determining the second set comprises using an imaging system as a basis for determining an angle between a third vector and a fourth vector, wherein the third vector extends from a particular balloon in the group towards the earth, and wherein the fourth vector extends from the particular balloon towards the celestial object.

10. The method of claim 1, wherein the reference point comprises a ground-based station, and wherein determining the second set comprises determining a distance between a particular balloon in the group and the ground-based station.

11. The method of claim 1, wherein the reference point comprises a ground-based station, and wherein determining the second set comprises determining an angle between a third vector and a fourth vector, wherein the third vector extends from the ground-based station towards the earth, and wherein the fourth vector extends from the ground-based station towards a particular balloon.

12. The method of claim 1, further comprising:
a ground-based receiver receiving the transmitted position of the target balloon relative to the earth; and
the ground-based receiver using the received position of the target balloon relative to the earth as a basis for determining the position of the ground-based receiver relative to the earth.

13. A non-transitory computer-readable medium having stored thereon program instructions that upon execution by a processor, cause performance of a set of functions, the set of functions comprising:
determining a first set of spatial relationships relating to a group of at least three balloons deployed in the stratosphere;
determining a second set of spatial relationships relating to at least a portion of the group and to a reference point;
determining a position of the reference point relative to the earth;
using the determined first set, the determined second set, and the determined position of the reference point relative to the earth as a basis for determining a position of a target balloon in the group relative to the earth; and
transmitting the determined position of the target balloon relative to the earth,
wherein using the determined first set, the determined second set, and the determined position of the reference point relative to the earth as a basis for determining the position of the target balloon relative to the earth comprises using an optimization function to determine the position of the target balloon relative to the earth.

14. The computer-readable medium of claim 13, wherein using the determined first set, the determined second set, and the determined position of the reference point relative to the earth as a basis for determining the position of the target balloon relative to the earth comprises:
using the determined first set as a basis for determining for each balloon in the group a position relative to the remaining balloons in the group; and
using the determined positions relative to the remaining balloons, the determined second set, and the determined position of the reference point relative to the earth as a basis for determining the position of the target balloon relative to the earth.

15. The computer-readable medium of claim 14, wherein using the determined first set as a basis for determining for each balloon in the group the position relative to the remaining balloons in the group comprises using a first optimization function to determine for each balloon in the group the position relative to the remaining balloons in the group,
and wherein using the determined positions relative to the remaining balloons, the determined second set, and the determined position of the reference point relative to the earth as a basis for determining the position of the target balloon relative to the earth comprises using a second optimization function to determine the position of the target balloon relative to the earth.

16. The computer-readable medium of claim 13, wherein the reference point comprises a ground-based station or a celestial object.

17. A system comprising:
a group of at least three balloons deployed in the stratosphere; and
a control system configured for:
determining a first set of spatial relationships relating to the group;
determining a second set of spatial relationships relating to at least a portion of the group and to a reference point;
determining a position of the reference point relative to the earth;
using the determined first set, the determined second set, and the determined position of the reference point relative to the earth as a basis for determine a position of a target balloon in the group relative to the earth; and
transmitting the determined position of the target balloon relative to the earth,
wherein using the determined first set, the determined second set, and the determined position of the reference point relative to the earth as a basis for determining the position of the target balloon relative to the earth comprises using an optimization function to determine the position of the target balloon relative to the earth.

18. The system of claim 17, wherein using the determined first set, the determined second set, and the determined position of the reference point relative to the earth as a basis for determining the position of the target balloon relative to the earth comprises:
using the determined first set as a basis for determining for each balloon in the group a position relative to the remaining balloons in the group; and
using the determined positions relative to the remaining balloons, the determined second set, and the determined position of the reference point relative to the earth as a basis for determining the position of the target balloon relative to the earth.

19. The system of claim 18, wherein using the determined first set as a basis for determining for each balloon in the group the position relative to the remaining balloons in the group comprises using a first optimization function to determine for each balloon in the group the position relative to the remaining balloons in the group,
and wherein using the determined positions relative to the remaining balloons, the determined second set, and the determined position of the reference point relative to the earth as a basis for determining the position of the target balloon relative to the earth comprises using a second optimization function to determine the position of the target balloon relative to the earth.

20. The system of claim 17, further comprising:
a ground-based receiver receiving the transmitted position of the target balloon relative to the earth; and
the ground-based receiver using the received position of the target balloon relative to the earth as a basis for determining the position of the ground-based receiver relative to the earth.

* * * * *